US010666763B2

(12) United States Patent
Antipa et al.

(10) Patent No.: US 10,666,763 B2
(45) Date of Patent: May 26, 2020

(54) AUTOMATIC INTEGRITY CHECKING OF CONTENT DELIVERY NETWORK FILES

(71) Applicant: ADOBE INC., San Jose, CA (US)

(72) Inventors: Damien Antipa, Saint-Louis (FR); Antonio Sanso, Duggingen (SZ)

(73) Assignee: Adobe Inc., San Jose, CA (US)

( * ) Notice: Subject to any disclaimer, the term of this patent is extended or adjusted under 35 U.S.C. 154(b) by 94 days.

(21) Appl. No.: 15/258,428

(22) Filed: Sep. 7, 2016

(65) Prior Publication Data
US 2018/0069947 A1    Mar. 8, 2018

(51) Int. Cl.
| H04L 29/08 | (2006.01) |
| G06F 16/23 | (2019.01) |
| H04L 29/12 | (2006.01) |
| H04L 29/06 | (2006.01) |
| G06F 16/338 | (2019.01) |

(52) U.S. Cl.
CPC ........ *H04L 67/327* (2013.01); *G06F 16/2379* (2019.01); *G06F 16/338* (2019.01); *H04L 29/12433* (2013.01); *H04L 63/0414* (2013.01); *H04L 67/02* (2013.01); *H04L 67/06* (2013.01); *H04L 67/1097* (2013.01); *H04L 67/20* (2013.01)

(58) Field of Classification Search
CPC ......... H04L 67/02; H04L 67/20; G06F 21/31; G06F 2221/2115; G06F 9/451
See application file for complete search history.

(56) References Cited

U.S. PATENT DOCUMENTS

| 7,644,286 B1 * | 1/2010 | Mohr ................... G06F 21/6209 713/185 |
| 2009/0228817 A1 * | 9/2009 | Adams .................. G06F 16/338 715/767 |
| 2012/0036352 A1 * | 2/2012 | Tovar ................ H04L 29/12433 713/153 |
| 2014/0068549 A1 * | 3/2014 | Friedman .................. G06F 8/30 717/104 |
| 2014/0233918 A1 * | 8/2014 | Roberts, Jr. .......... G11B 27/323 386/285 |
| 2015/0227533 A1 * | 8/2015 | Goldstein ........... G06F 16/2379 707/661 |
| 2015/0281318 A1 * | 10/2015 | Warner ................... H04L 67/02 709/217 |
| 2016/0212101 A1 * | 7/2016 | Reshadi .............. H04L 63/0414 |

* cited by examiner

*Primary Examiner* — Barbara B Anyan
(74) *Attorney, Agent, or Firm* — Brake Hughes Bellerman LLP

(57) ABSTRACT

Techniques for automatically generating an integrity check hash value for a content asset served by a third-party server when the content asset is added to a template in a user interface. The techniques include displaying, by the user interface, a visual layout of web content, the UI configured to receive modifications to a component of the web content. The component comprising a template for generating hypertext markup language (HTML) embodying the component. The techniques further include receiving a modification to the component of the web content, wherein the modification includes instructions to include a content asset in the component of the web content and detecting that the content asset is hosted on a third-party server. Additionally, the techniques include generating HTML for the web content, the HTML including an integrity hash value for the content asset based on the template.

18 Claims, 6 Drawing Sheets

AUTOMATIC INTEGRITY CHECKING OF CONTENT DELIVERY NETWORK FILES

BACKGROUND

There is an increasing amount of web content made available via the Internet for consumption by web browsers, web-enabled applications (e.g., smartphone applications, widgets, etc.), and the like. Correspondingly, content delivery networks (CDNs) have become more popular for distributing the increasing amount of web content more efficiently. CDNs serve a large fraction of Internet content, for example, web objects (text, graphics and scripts), downloadable objects (media files, software, documents), applications (e-commerce, portals), live streaming media, on-demand streaming media, and social networks. Additionally, CDNs are increasingly used to host open source software and common modules for JavaScript code that are provided to users via web browsers and web-enabled applications via the internet. Since CDNs are typically common web servers, the content provided by the CDN may be compromised (e.g., modified by someone to include malicious software) and infect user devices consuming the content from the CDN. Techniques have been introduced to increase the security of CDNs and prevent content that has been compromised being distributed to user devices. However, current techniques require multiple steps and custom code to implement.

SUMMARY

The techniques introduced herein overcome the deficiencies and limitations of the prior art, at least in part, with a system and method for automatically generating an integrity check hash value for a content asset served by a third-party server when the content asset is added to a template in a user interface. The techniques include displaying, by the user interface, a visual layout of web content, the UI configured to receive modifications to a component of the web content. The component comprising a template for generating hypertext markup language (HTML) embodying the component. The techniques further include receiving a modification to the component of the web content, wherein the modification includes instructions to include a content asset in the component of the web content and detecting that the content asset is hosted on a third-party server. Additionally, the techniques include generating HTML for the web content, the HTML including an integrity hash value for the content asset based on the template.

Other aspects include corresponding methods, systems, apparatuses, and computer program products for these and other innovative aspects.

The features and advantages described herein are not all-inclusive and many additional features and advantages will be apparent in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Figure 1:
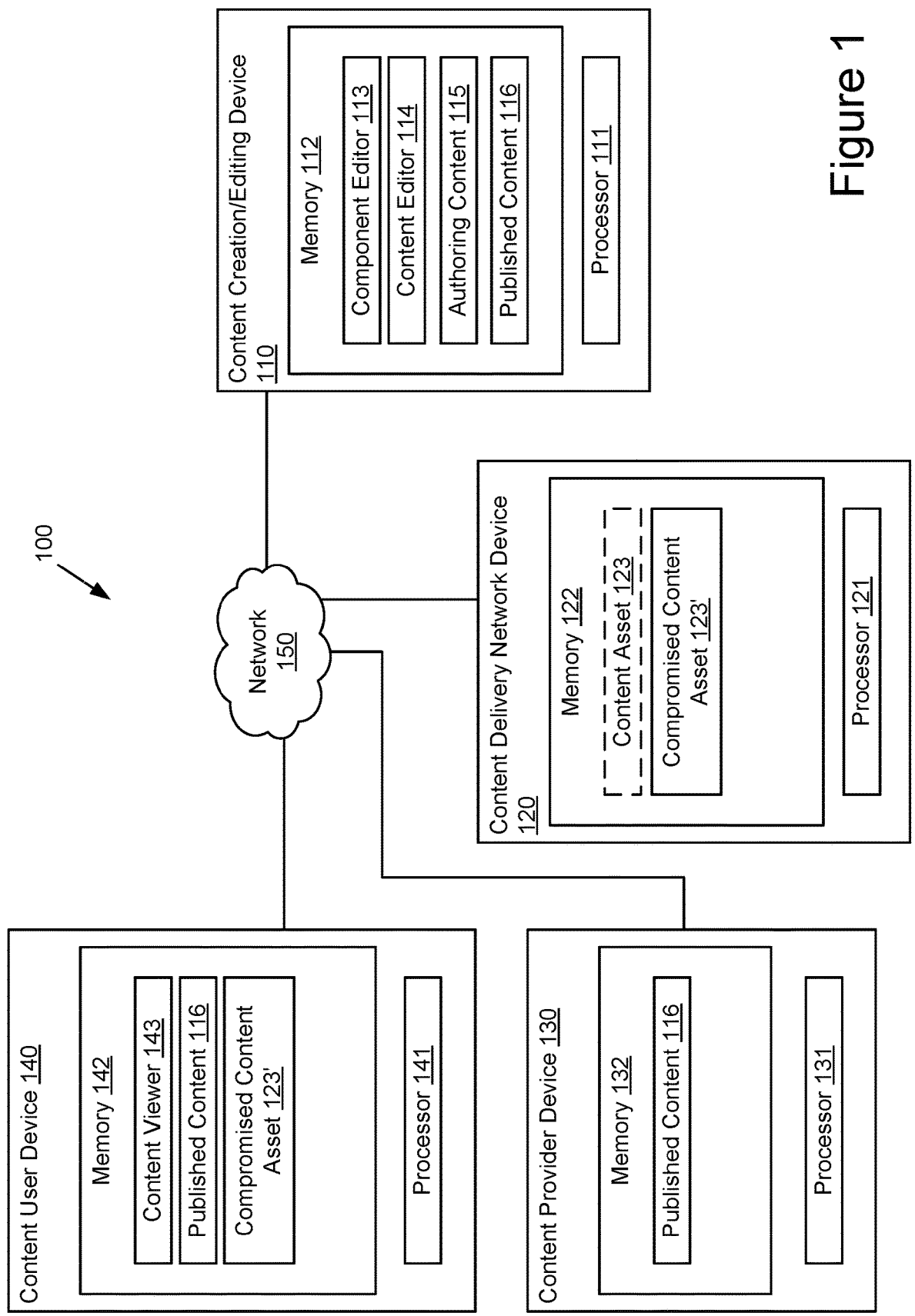
FIG. 1 is a block diagram depicting an example computing environment in which content from a CDN has been compromised and loaded on a content user device.

While existing web browsers support validation of web content assets provided by a third-party server (e.g., a CDN) by comparing a prior hash of a web content asset and a hash of the web content asset that is calculated upon receiving the asset from the third-party server, this technique requires the content author to generate the hash and embed the hash in the web page or application used to access the web content. For example, when the web content is JavaScript hosted on a third-party server, the Hypertext Markup Language (HTML) that makes up the webpage may include an integrity check similar to below:

<script src='https://example.com/example-framework.js' integrity='sha384-oqVuAfXRKap7fdgcCY5uykM6+R9GqQ8K/uxy9rx7HNQIGYI1kPzQho1wx4JwY8wC' crossorigin='anonymous'></script>

This technique may not be possible for content authors who are generating web content via a content management system with a 'what you see is what you get (WYSIWYG) interface. Such systems may facilitate content authors being able to dynamically switch between and preview different variants of a content asset (e.g., an image, JavaScript module, etc.) to see the asset in context with other components of the web page, add new variants of the asset for new target audiences, and to change or remove existing components. For example, a content management system such as Adobe® Experience Manager can maintain two sets of assets for web content: authoring content and published content. The authoring content can include edited components of electronic content, including assets hosted by third-party servers, and/or experiences added or modified by a content author. The published content can be created from authoring content in response to the content author explicitly activating electronic content, such as a web page, to publish the content. A single input or selection, such as a click, can activate (i.e., publish) the authoring content. When content is activated, the published content is synchronized between the content management system and a production web server serving the live web content to web page visitors or application users.

However, since the content author is not typically able to (or may not know how to) alter the HTML that is delivered to the end user, a hash of an asset hosted on a third-party server cannot be included in the final HTML page hosted by a web server. To solve this problem, the techniques introduced herein include a content management system, such as Adobe® Experience Manager, that automatically detects when a content author has included a content asset in a project that is served by a third-party server (e.g., a CDN) and injects an integrity verification component into the HTML. In some embodiments, a content management system, according to the techniques introduced herein, may automatically detect an update to authoring content and detect whether a content asset from a third-party server is included in the authoring content. Upon detecting the content asset from the third-party server, the content management system creates a verification hash for the content asset and updates the HTML to include the verification hash. Additionally, the content management system may include an identification of the content asset and the verification hash in a database of known content assets so that the content asset can be used in a separate project without having to regenerate the hash. Further, the content management system may inject functionality in the HTML to report a content asset that fails to match the verification hash. The report may be sent to the administrator of the web page and/or third-party server, for example.

Embodiments disclosed herein provide various advantages over existing systems. Such benefits, for example, may include providing integrated and easy-to-use user interfaces that allow efficient creation and modification of web content while maintaining security of content assets that are hosted by third-party servers included in the web content.

FIG. 1 is a block diagram depicting an example computing environment 100 in which content from a CDN has been compromised. Applications edit, display, store, serve and otherwise use web and other electronic content on the computing devices 110, 120, 130, and 140. Such applications are shown as functional components or modules. It should be apparent that such applications and content may be resident in any suitable computer-readable medium and execute on any suitable processor. As shown, the computing devices 110, 120, 130, and 140 respectively comprise a computer-readable medium such as random access memory (RAM) 112, 122, 132, and 142 coupled to a processor 111, 121, 131, and 141 configured to execute computer-executable program instructions and/or accesses information stored in the memory 112, 122, 132, and 142. Such processors 111, 121, 131, and 141 may each comprise a microprocessor, an application specific integrated circuit (ASIC), a state machine, or other processor, and can be any of a number of computer processors. Such a processor can comprise, or may be in communication with a computer-readable medium which stores instructions that, when executed by the processor, cause the processor to perform the techniques introduced herein.

A computer-readable medium, such as memory 112, 122, 132, and 142, may comprise, but is not limited to, an electronic, optical, magnetic, or other storage device capable of providing a processor with computer-readable instructions. Other examples comprise, but are not limited to, a floppy disk, compact disc read-only memory (CD-ROM), digital video disc (DVD), magnetic disk, memory chip, read only memory (ROM), RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

Computing devices 110, 120, 130, and 140 may also comprise a number of external or internal devices such as a mouse, a keyboard, a display, audio speakers, one or more microphones, or any other input or output devices. The display device can be used, for example, to render user interfaces with which users interact. Computing devices 110, 120, 130, and 140 could be personal computing devices, mobile devices, web servers, file servers, database servers, CDNS, or any other type of electronic device appropriate for providing one or more of the features described herein.

Computing devices 110, 120, 130, and 140 can include any suitable computing devices for hosting the respective modules shown in FIG. 1. In embodiments, the computing devices 110, 120, 130, and 140 are implemented as a single, integrated computing system. In alternative or additional embodiments, one or more of computing devices 110, 120, 130, and 140 may include a virtual server implemented using multiple computing systems, clients, or servers connected in a grid or cloud computing topology. As described below with reference to FIG. 6, each of the processors 111, 121, 131, and 141 may be a single processor in a multi-core/multiprocessor system. Such a system can be configured to operate alone with a single server or in a cluster of computing devices operating in a cluster or server farm.

The content creation/editing device 110 in FIG. 1 comprises a component editor 113 and a content editor 114 stored in memory 112. The editors 113 and 114 may be part of a single application spread out into individual modules or functions. In alternative embodiments, one or more of editors 113 and 114 can be hosted on a separate device. In yet other alternative embodiments, multiple users (e.g., content authors) are able to access one or more of editors 113 and 114 on one or more computing devices to collaboratively create and edit web content. In one embodiment, content creation/editing device 110 can host a content management system as described herein, where the content management system includes editors 113 and 114.

Component editor 113, for example, may be used by a software engineer or content author to create and edit a component of web content. For example, a "component" may be a template instantiated as one or more instances in electronic content, each instance of the component having common aspects derived from a template. Examples of components include, but are not limited to, a breadcrumbs bar, a download link, an image, a video player, a dialog box, and a search box. For example, an image banner for a web page can be a component. Most (if not all) visual elements in a web page and other electronic content can be implemented as instances, variants, or versions of a component. In certain embodiments, components include items of content for a web page. Components and instances of components can be identified by a reference or pointer, such as, for example, a Uniform Resource Locator (URL). The pointer can identify a code snippet, such as, for example, a JavaScript snippet executable to load content at the identified URL.

The content editor 114, for example, could be used by a web site developer or content author to create web content using one or more components created using the component editor 113. The content editor 114 can be used to find and select assets, such as images, scripts, text, etc., that can be used to create web content. By interacting, using an input device, with the content editor 114, a content author can drag and drop a new asset to add the new asset to the unpublished authoring content 115. For example, an author can find an image related to the subject of the web content and drag that image to add the image to the unpublished authoring content 115.

As used herein, the term "web content" refers to any type of resource or media that can be rendered for display on computing devices. Web content can include text or multimedia files, such as images, video, audio, or any combination thereof. Web content can also include application software that is designed to perform one or more specific tasks at a computing system or computing device. Computing devices include client and server devices such as, but not limited to, servers, desktop computers, laptop computers, smart phones, video game consoles, smart televisions, tablet computers, portable gaming devices, personal digital assistants (PDAs), etc. Web content can be streamed to, replicated to, downloaded by, and/or uploaded from computing devices. Web content can include multimedia hosted on web sites, such as Internet web sites, intranet web sites, standard web pages, or mobile web pages specifically formatted for display on mobile computing devices. Web content may be downloaded from a content provider server, a third-party server, such as a content delivery network server, or a combination thereof. Web content can also include application software developed for computing devices that is designed to perform one or more specific tasks at the computing device.

As shown in the example of FIG. 1, the content creation/editing device 110 can store authoring content 115. The authoring content 115 includes web page content edited using content editor 114 and/or web page components edited using component editor 113. The published content 116 includes activated content replicated to a live content provider device (e.g., content provider device 130). This published content can include content for a live, active web content. Upon publication of the authoring content 115 at the content creation/editing device 110, a copy of the authoring content 115 is saved as published content 116 and then replicated from the content creation/editing device 110 to a content provider device 130 via network 150. Network 150 may be a data communications network such as the Internet. In some embodiments, network 150 can be one or a combination of networks, such as the Internet, a Wide Area Network (WAN), WiFi, a Local Area Network (LAN), or any other wired or wireless network.

Although a single content provider device 130 is depicted in the example of FIG. 1, it is to be understood that in alternative embodiments, the published content 116 can be replicated to a plurality of content provider devices. In embodiments where the published content 116 is content of a web page, the published content 116 can be replicated from the content creation/editing device 110 to a web server, such as content provider device 130, serving the web page content to web page visitors. Such replication can be performed by a content synchronization service via network 150. In this way, published content 116 is simultaneously available to a user in a content viewer 143 of a content user device 140 of the published content 116 and an author in content creation/editing device 110. In additional or alternative embodiments, the content provider device 130 can be embodied as a file server, database server, or cloud-based storage device configured to host a copy of the published content 116 and provide the published content 116 to users.

The content user device 140 shown in the example of FIG. 1 can be used to access and display the published content 116. A web site visitor or other user can execute a content viewer 143 of the content user device 140 to display, play or otherwise use the published content 116. The content user device 140 can be any computing device capable of executing a content viewer 143 suitable for accessing and rendering the published content 116. For example, the content user device 140 can be a desktop computer, a laptop computer, a smart phone, a video game console, a smart television, a tablet computer, a portable gaming device, a personal digital assistant (PDA), or the like. As shown in the example of FIG. 1, the content viewer 143 can be embodied as an Internet browser configured to render and use web site content included in the published content 116. In other embodiments, the content viewer 143 can be embodied as an application (e.g., a mobile application) configured to render and use the published content 116.

In certain embodiments, a content asset 123 can be stored on and served from a third-party server, such as CDN device 120. CDN device 120 may be one of a network of globally distributed servers to provide high availability and high performance when accessing the content asset 123. CDNs, or other third-party server arrangements, serve a large fraction of Internet content, including web objects (text, graphics and scripts), downloadable objects (media files, software, documents), applications (e-commerce, portals), live streaming media, on-demand streaming media, and social networks. While CDNs may improve performance of web content by placing content assets closer on a network to the end user, the content provider loses control of the content asset 123. For example, an attacker can access the CDN and replace content asset 123 with compromised content asset 123' and security measures taken on content provider device 130 can be circumvented. The compromised content asset 123' may be used to load harmful software to content user device 140 of any user who loads web content intended to include the content asset 123 without an integrity check by loading the compromised content asset 123' as depicted in the example of FIG. 1.

Figure 2:
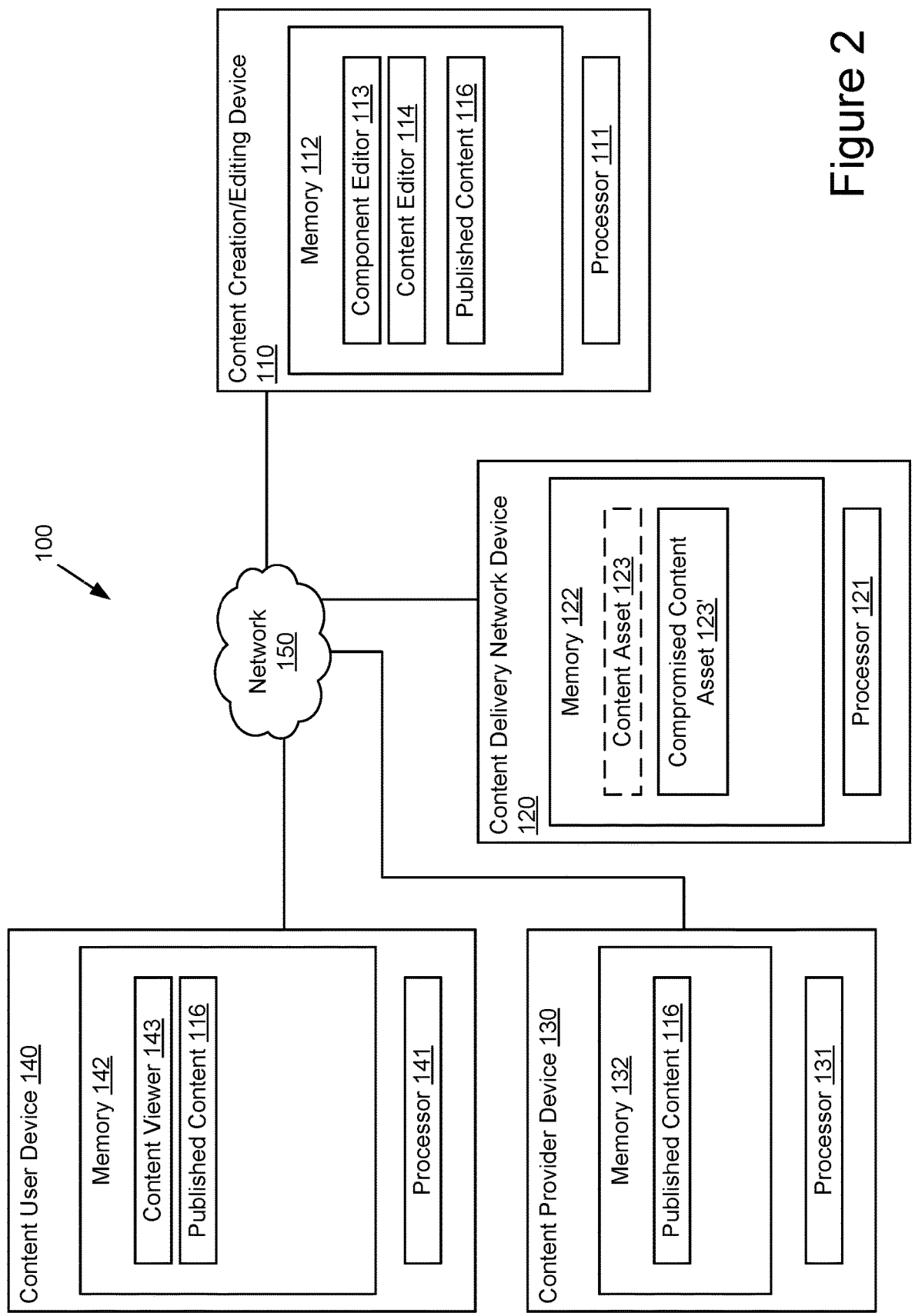
FIG. 2 is a block diagram depicting an example computing environment in which content from a CDN has been compromised and not loaded on a content user device.

FIG. 2 is a block diagram depicting an example computing environment 100 in which content from a CDN has been compromised and not loaded on a content user device. As described above, the techniques introduced herein include a content editor 114 on the content creation/editing device 110 that that generate HTML based on a content author's interaction with templates in a WYSIWYG user interface (UI). The templates, according to the techniques introduced herein, include a script to detect whether a content asset, included in a component of web content depicted in the WYSIWYG UI, is hosted on a third-party server, such as a CDN server and generate a verification hash value for the content asset. The script may be, for example, an HTML Template Language (HTL) script, or another templating language script. In one example, when a template includes a reference to a JavaScript content asset hosted on a third-party server, the HTL script 'sly-verify-integrity' may be included in the template as shown below:
<script src='https://example.com/example-framework.js' sly-verify-integrity='true'></script>.

When a content author publishes authoring content via the content editor 114, the HTL script causes the content editor 114 to determine that the content asset 123 is hosted on a third-party server (e.g., CDN device 120). In response to determining that the content asset is hosted on a third-party server, the content editor 114 downloads the content asset 123 and generates a verification hash value for the content asset 123. In some embodiments, the content editor 114 stores the verification hash value for the content asset 123 with an identifier for the content asset. The stored verification hash value can be used by the content editor 114 for use in including the verification hash value in HTML for other web content that includes the content asset 123 without having to download and generate the verification hash value again.

As described above, an attacker can access the CDN and replace content asset 123 with compromised content asset 123' and security measures taken on content provider device 130 can be circumvented. The compromised content asset 123' may be used to load harmful software to content user device 140 of any user who loads web content intended to include the content asset 123. However, because the content editor 114, detects the content asset 123, generates a verification hash value for the content asset 123, and includes the verification hash value in published content 116, content viewer 143 may validate the web content asset 123 before loading the content asset. For example, the content viewer 143 may calculate a verification hash value for the compromised content asset 123' and compare the calculated verification hash value with the verification hash value for the content asset 123 provided in the HTML by the content editor 114. Since it is improbable that a verification hash value calculated for the compromised content asset 123' will match the verification hash value provided for the content asset 123, the content viewer 143 can refuse to load the compromised content asset 123' as depicted in the example of FIG. 2.

Figure 3:
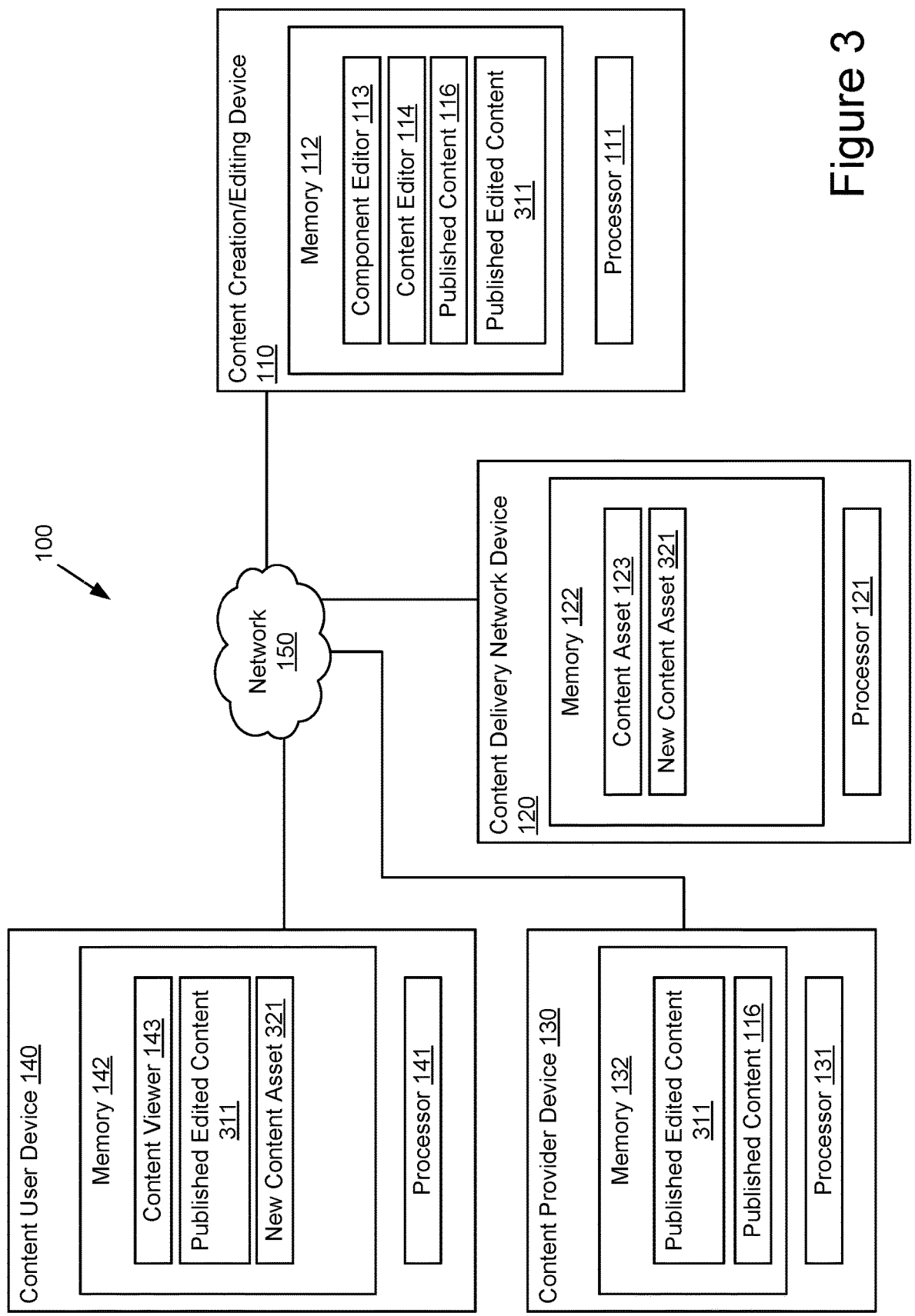
FIG. 3 is a block diagram depicting an example computing environment 100 in which content from a CDN has been compromised and not loaded on a content user device.

FIG. 3 is a block diagram depicting an example computing environment 100 in which content from a CDN has been compromised and not loaded on a content user device. Web content that a content author has published and propagated to the content provider device 130 (e.g., published content 116) may need to be updated. In other situations, multiple variants of web content that is tailored to particular users can be generated by a content author. In either case, published content may be edited to include content assets from a third-party server. In the example of FIG. 3, a content author has edited published content 116, and published the edits, to create published edited content 311. One of the edits that could be made by the content author is, for example, including a new content asset 321 hosted by the content delivery network device 120 in place of content asset 123.

According to the techniques disclosed herein, the content editor 114 automatically detects the edit to the published content 116 and detects that the new content asset 321 is server from content delivery network device 120. Upon publishing edited content, the content editor 114 creates a verification hash value for the new content asset 321 and updates the HTML for the published edited content 311 to include the verification hash. When the content viewer 143 of the content user device 140 receives the published edited content 311 and requests the new content asset 321, the content viewer 143 compares the verification hash value for the new content asset 321 from the HTML of the published edited content 311 and a verification hash value calculated for the new content asset 321 retrieved from the content delivery network device 120. If the verification hash values match, the content viewer 143 of the content user device 140 loads the new content asset 321 as depicted in the example of FIG. 3.

Figure 4:
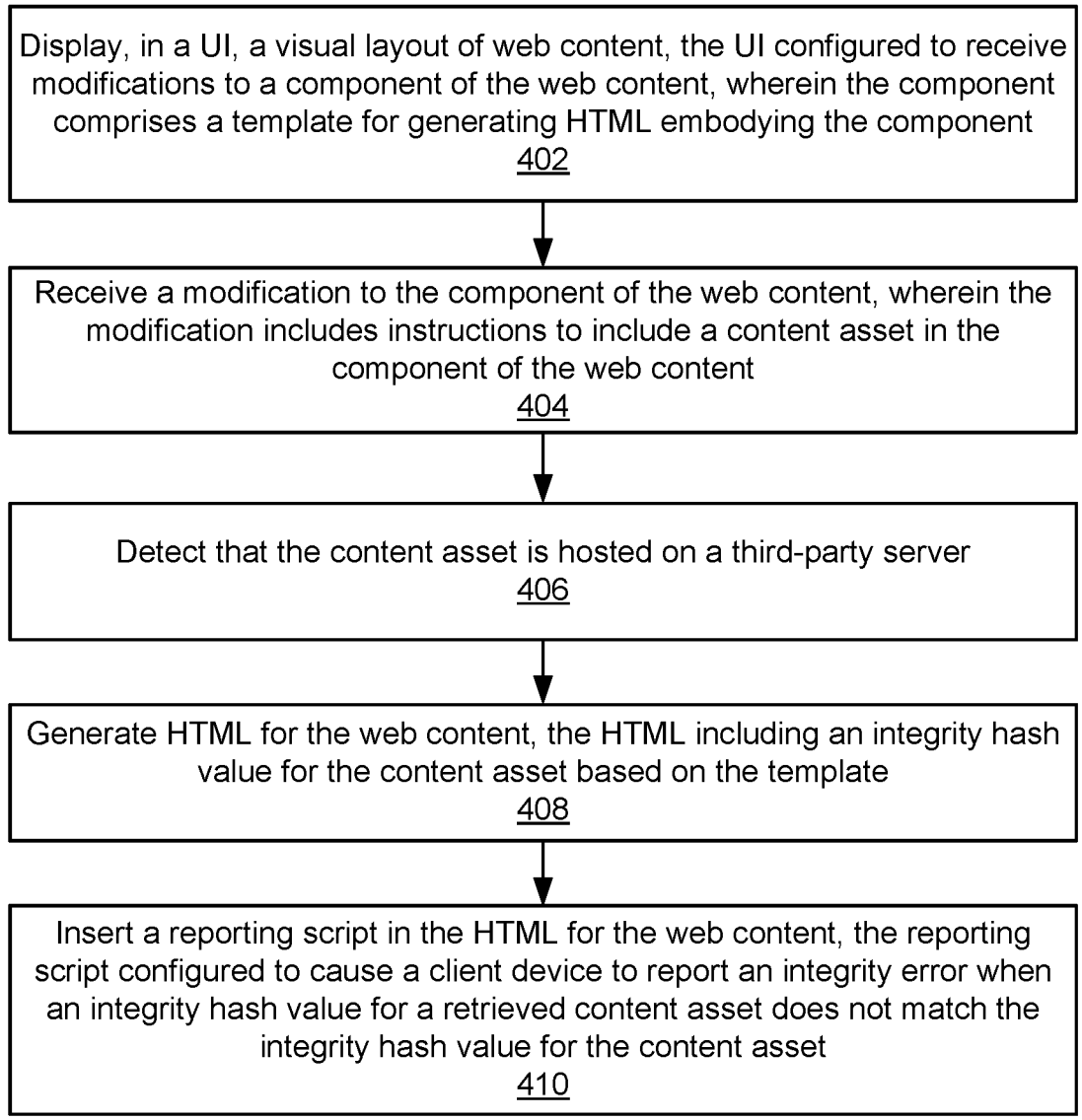
FIG. 4 is a flow chart illustrating an example method for automatically generating a verification hash value for a content asset hosted on a content delivery network device according to the disclosed techniques.

FIG. 4 is a flow chart illustrating an example method for automatically generating a verification hash value for a content asset hosted on a content delivery network device according to the disclosed techniques. At 402, a content editor 114 of a content creation/editing device 110 displays a visual layout of web content in a UI. For example, the UI may be an authoring UI of a content management system (e.g., Adobe® Experience Manager) that allows a content author to drag and drop components in a WYSIWIG fashion. The UI is configured to receive modifications to a component of the web content. For example, the content author can interact with the UI to include an image or script in the web content. The component, which can be authored using component editor 113, includes a template for generating HTML embodying the component.

At 404, the UI of content editor 114 receives a modification to the component of the web content. For example, the modification may include instructions to include a content asset in the component of the web content. In some embodiments, the content asset may be hosted on a third-party server, for example, a content delivery network server. At 406, the content editor 114 detects that the content asset is hosted on a third-party server. For example, the content editor 114 may detect that the location of the content asset includes a URL for a content delivery network.

At 408, the content editor 114 generates HTML for the web content. For example, in response to a user input to publish the content. The templates for components used by the content author include instructions for generating the HTML. In particular, the templates include a script to generate an integrity hash value for content assets that are hosted on a third-party server. The script may include instructions to download the content asset from the third party server and generate the integrity hash value for the content asset. The integrity hash value may be calculated by known, or specially developed, cryptographic hash algorithms. For example, the content editor 114 may generate the integrity hash value using the SHA-384 algorithm. Other hash algorithms may be used (e.g., Merkle-Damgard, Secure Hash Algorithm (SHA), and the like).

At 410, the content editor 114 inserts a reporting script in the HTML for the web content. In some embodiments, the templates may include instructions to generate the reporting script. The reporting script, when executed by a content viewer 143 on a content user device 140, causes the content viewer 143 to report an integrity error when an integrity hash value for a retrieved content asset does not match the integrity hash value expected for the content asset.

Figure 5:
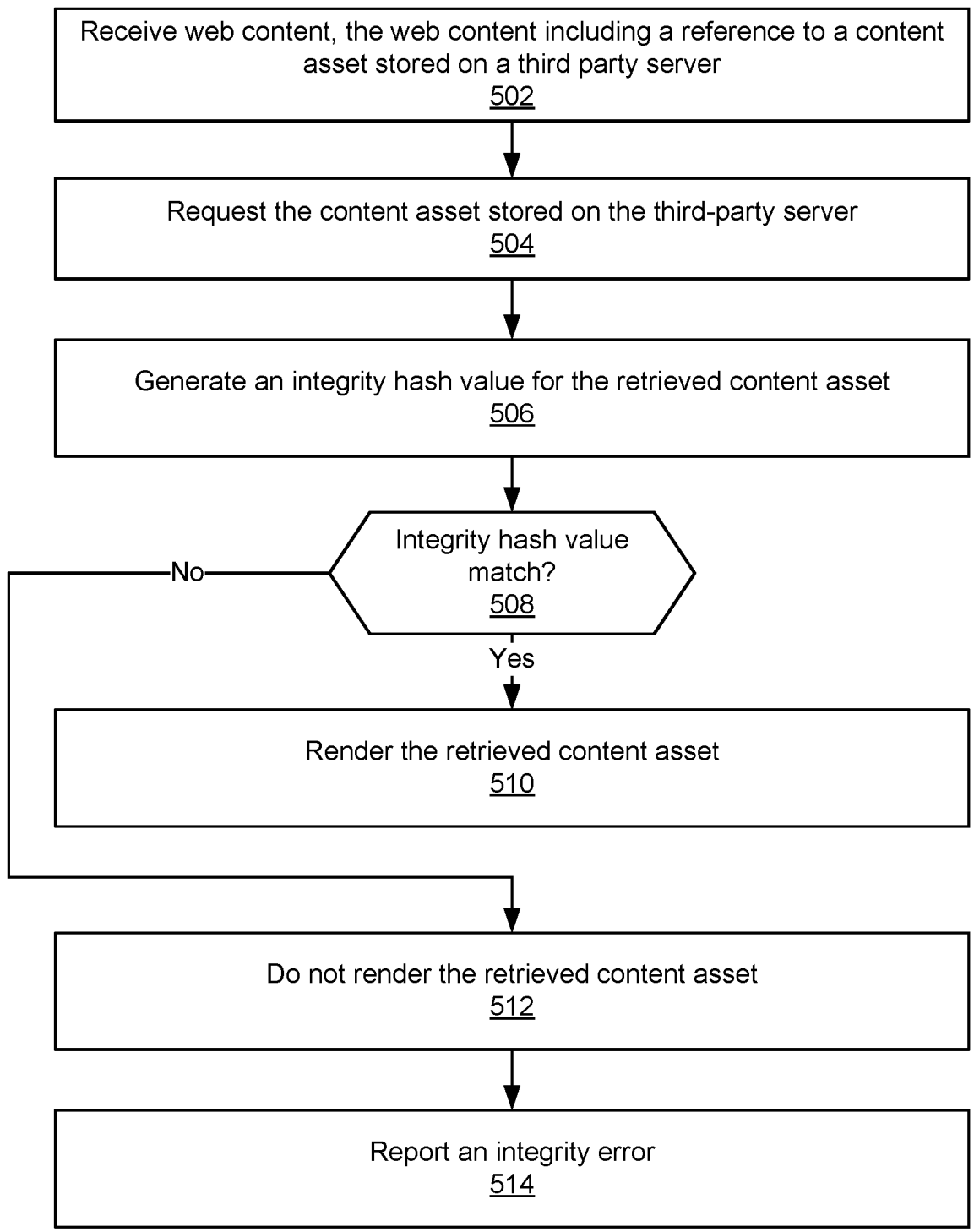
FIG. 5 is a flow chart illustrating an example method for performing a content integrity check according to the disclosed techniques.

FIG. 5 is a flow chart illustrating an example method for performing a content integrity check according to the disclosed techniques. At 502, a content viewer 143 of the content user device 140 receives web content. For example, a user may enter a URL for the web content in a web browser and requests the content associated with the URL. When the content viewer 143 renders the HTML of the published content 116 received from the content provider device 130, at 504, the content viewer 143 requests the content asset 123 stored on the third-party server. At 506, the content viewer 143 generates an integrity hash value for the retrieved content asset and compares the generated integrity hash value with the expected integrity hash value for the content asset included in the HTML. If, at 508, the integrity hash value for the retrieved content asset matches the expected integrity hash value from the HTML, the content viewer 143 renders, at 510, the retrieved content asset. However, if at 508, the integrity hash value for the retrieved content asset does not match the expected integrity hash value from the HTML, the content viewer 143, at 512, does not render the retrieved content asset and, at 514, reports an integrity error to the content provider device 130. As used herein, rendering a content asset, means executing operations to cause the content asset to the intended result. For example, rendering may include displaying an image, executing a script, generating audio and/or video, etc.

Figure 6:
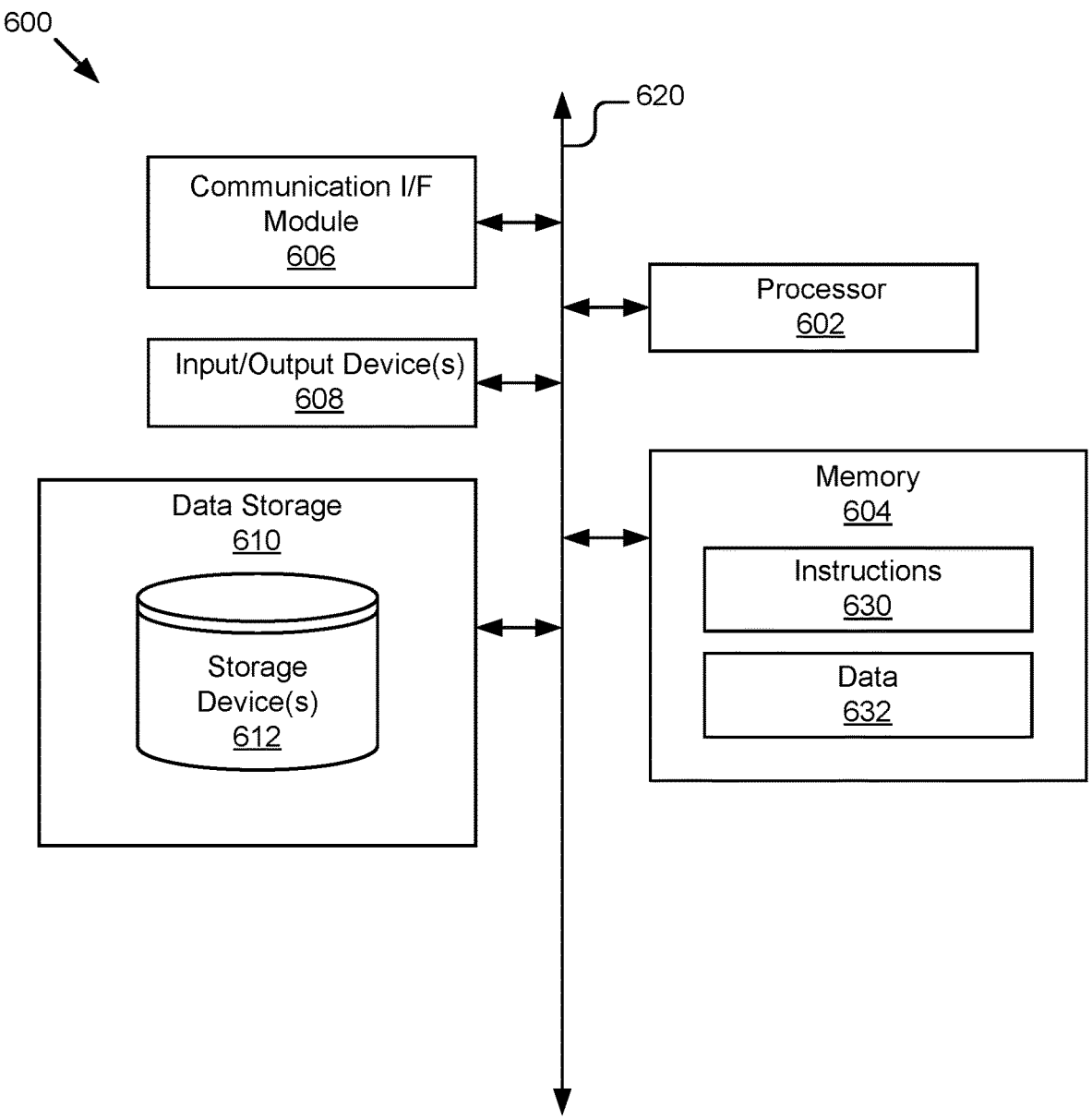
FIG. 6 is a block diagram illustrating one embodiment of a computing device suitable for implementing the techniques and methods described herein.

Any suitable computing system or group of computing systems can be used to implement the techniques and methods described herein. For example, as described above, an image editing application exposes an image for editing to a user, generates fill polygons corresponding to empty areas between a frame and an image, and applies a content aware fill operation to fill the empty areas with pixels from the image. FIG. 6 is a block diagram illustrating one embodiment of a computing device (e.g., personal computer, mobile device, cloud computing system, etc.) 600 suitable for implementing the techniques and methods described herein. The computing device 600 may include a processor 602, a memory 604, a communication interface module 606, input/output device(s) 608, and data storage 610 according to some examples. The components of the computing device 600 are communicatively coupled by a bus or software communication mechanism 620. The bus 620 may represent one or more buses including an industry standard architecture (ISA) bus, a peripheral component interconnect (PCI) bus, a universal serial bus (USB), or some other bus known in the art to provide similar functionality.

The processor 602 may execute software instructions by performing various input/output, logical, and/or mathematical operations. The processor 602 may be physical and/or virtual, and may include a single processing unit or a plurality of processing units and/or cores. The processor 602 may comprise a microprocessor, an application specific integrated circuit, a state machine, or other processing device. In some implementations, the processor 602 may be coupled to the memory 604 via the bus 620 to access data and instructions therefrom and store data therein. The bus 620 may couple the processor 602 to the other components of the computing device 600 including, for example, the memory 604, the communication interface module 606, and the data storage 610. It will be apparent that other processors, operating systems, sensors, displays, and physical configurations are possible.

The memory 604 may store and provide access to data for the other components of the computing device 600. The memory 604 may be included in a single computing device or distributed among a plurality of computing devices. In some implementations, the memory 604 may store instructions 630 that may be executed by the processor 602 and/or data 632 that may be manipulated by the processor 602. The instructions 630 may include code for performing the techniques described herein. The memory 604 is also capable of storing other instructions and data, including, for example, an operating system, hardware drivers, other software applications, databases, etc. The memory 604 may be coupled to the bus 620 for communication with the processor 602 and the other components of the computing device 600.

The memory 604 may include one or more non-transitory computer-usable (e.g., readable, writeable) devices, for example, a dynamic random access memory (DRAM) device, a static random access memory (SRAM) device, an embedded memory device, a discrete memory device (e.g., a PROM, FPROM, ROM), a hard disk drive, an optical disk drive e.g., CD, DVD), or the like, which can be any tangible apparatus or device that can contains, stores, communicates, or sports instructions, data, computer programs, software, code, routines, etc., for processing by, or in connection with, the processor 602. In some implementations, the memory 604 may include one or more of volatile memory and non-volatile memory. It should be understood that the memory 604 may be a single device or may include multiple types of devices and configurations.

The communication interface module 606 is hardware and/or software for receiving and transmitting data by linking the processor 602 to a network or other processing systems. The communication interface module 606 may receive data and/or instructions and transmit the data and/or instructions to the processor 602 for execution. In one embodiment, the communication interface module 606 may include a port for direct physical connection to a communication channel. The communication interface module 606 may also or alternatively include a wireless transceiver for transmitting and receiving instructions and/or data using one or more wireless communication methods, such as IEEE 802.11, IEEE 802.16, Bluetooth®, or another suitable wireless communication method.

The input/output device(s) 608 may be internal or external devices that facilitate communication between the computing device 600 and a human user. For example, the input/output devices may include a keyboard, touchscreen display, microphone, speakers, etc.

The data storage 610 may include storage device(s) 612 that provide a non-transitory memory to store data for providing the functionality described herein. In some embodiments, the storage device(s) 612 may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information.

In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment.

Accordingly, the disclosure is intended to be illustrative, but not limiting, of the scope of the specification, which is set forth in the following claims.

What is claimed is:

1. A method comprising:
   displaying, in a user interface (UI) of a computing device, a visual layout of web content, the UI configured to receive modifications to a component of the web content, wherein the component comprises a template for generating hypertext markup language (HTML) embodying the component;
   receiving, at the computing device, a modification to the component of the web content, wherein the modification includes instructions to include a corresponding content asset in the component of the web content;
   detecting, by the computing device and in response to receiving the modification to the component, that the corresponding content asset is hosted on a third-party server; and
   generating, based on the detecting that the content asset is hosted on a third-party server, HTML for the web content, the HTML including an integrity hash value for the content asset generated by the template, the integrity hash value distinguishing the content asset from an illicit version of the content asset stored by an unauthorized party on the third-party server for purposes of deceptive downloading thereof to a content user device,
   wherein the template includes a detecting script configured to execute the detecting that the content asset is hosted on the third-party server, and a generating script configured to execute the generating of the HTML for the web content.

2. The method of claim 1, further comprising:
   propagating, by the computing device, HTML for the web content to a web server, the HTML for the web content including the integrity hash value for the content asset.

3. The method of claim 1, wherein generating HTML for the web content further comprises:
   inserting, by the computing device, a reporting script in the HTML for the web content, the reporting script configured to cause a client device to report an integrity error when an integrity hash value for a retrieved content asset does not match the integrity hash value for the content asset.

4. The method of claim 1, further comprising:
   storing, by the computing device, the integrity hash along with a reference to the content asset; and
   retrieving, by the computing device, the integrity hash in response to the content asset being used in a second component of the web content.

5. The method of claim 1, further comprising:
   receiving, by the computing device, an input to publish the web content, wherein detecting that the content asset is hosted on a third-party server and generating HTML for the web content ensue in response to the input.

6. The method of claim 1, wherein the detecting script is further configured to detect that the content asset is hosted on the third-party server including detecting that a location of the content asset includes a Uniform Resource Locator (URL) for a content delivery network server, and the generating script is further configured to execute the generating of the integrity hash value.

7. A system comprising;
   one or more processors; and
   a memory, the memory storing instructions, which when executed cause the one or more processors to:
      display, in a user interface (UI), a visual layout of web content, the UI configured to receive modifications to a component of the web content, wherein the component comprises a template for generating hypertext markup language (HTML) embodying the component;
      receive a modification to the component of the web content, wherein the modification includes instructions to include a corresponding content asset in the component of the web content;
      detect, in response to receiving the modification to the component, that the corresponding content asset is hosted on a third-party server; and
      generate, based on the detection that the content asset is hosted on the third-party server, HTML for the web content, the HTML including an integrity hash value for the content asset generated by the template, the integrity hash value distinguishing the content asset from an illicit version of the content asset stored by an unauthorized party on the third-party server for purposes of deceptive downloading thereof to a content user device,
      wherein the template includes a detecting script configured to execute the detecting that the content asset is hosted on the third-party server, and a generating script configured to execute the generating of the HTML for the web content.

8. The system of claim 7, wherein the instructions further cause the one or more processors to:
   propagate HTML for the web content to a web server, the HTML for the web content including the integrity hash value for the content asset.

9. The system of claim 7 wherein, to generate HTML for the web content, the instructions further cause the one or more processors to:
   insert a reporting script in the HTML for the web content, the reporting script configured to cause a client device to report an integrity error when an integrity hash value for a retrieved content asset does not match the integrity hash value for the content asset.

10. The system of claim 7, wherein the instructions further cause the one or more processors to:
    store the integrity hash along with a reference to the content asset; and
    retrieve the integrity hash in response to the content asset being used in a second component of the web content.

11. The system of claim 7, wherein the instructions further cause the one or more processors to detect that the content asset is hosted on a third-party server and generate HTML for the web content ensue in response to receiving an input to publish the web content.

12. The system of claim 7, wherein the third-party server is a content delivery network server.

13. A non-transitory computer readable medium storing instructions which, when executed by a computer, cause the computer to perform operations comprising:
    displaying, in a user interface (UI) of a computing device, a visual layout of web content, the UI configured to receive modifications to a component of the web content, wherein the component comprises a template for generating hypertext markup language (HTML) embodying the component;
    receiving a modification to the component of the web content, wherein the modification includes instructions to include a corresponding content asset in the component of the web content;

detecting, in response to receiving the modification to the component, that the content asset is hosted on a third-party server; and generating, based on the detecting that the content asset is hosted on the third-party server, HTML for the web content, the HTML including an integrity hash value for the content asset generated by the template, the integrity hash value distinguishing the content asset from an illicit version of the content asset stored by an unauthorized party on the third-party server for purposes of deceptive downloading thereof to a content user device, wherein the template includes a detecting script configured to execute the detecting that the content asset is hosted on the third-party server, and a generating script configured to execute the generating of the HTML for the web content.

14. The computer readable medium of claim 13, the operations further comprising:

propagating HTML for the web content to a web server, the HTML for the web content including the integrity hash value for the content asset.

15. The computer readable medium of claim 13, wherein generating HTML for the web content further comprises:

inserting a reporting script in the HTML for the web content, the reporting script configured to cause a client device to report an integrity error when an integrity hash value for a retrieved content asset does not match the integrity hash value for the content asset.

16. The computer readable medium of claim 13, the operations further comprising:

storing the integrity hash along with a reference to the content asset; and retrieving the integrity hash in response to the content asset being used in a second component of the web content.

17. The computer readable medium of claim 13, the operations further comprising:

receiving an input to publish the web content, wherein detecting that the content asset is hosted on a third-party server and generating HTML for the web content ensue in response to the input.

18. The computer readable medium of claim 13, wherein the third-party server is a content delivery network server.

* * * * *